(12) United States Patent
Teodorescu et al.

(10) Patent No.: US 9,926,747 B2
(45) Date of Patent: *Mar. 27, 2018

(54) METHOD OF INCORPORATING REMOTE COMMUNICATION WITH OILFIELD TUBULAR HANDLING APPARATUS

(71) Applicant: Weatherford Technology Holdings, LLC, Houston, TX (US)

(72) Inventors: Sorin Gabriel Teodorescu, The Woodlands, TX (US); Hallvard Svadberg Hatloy, Tananger (NO); Tarald Gudmestad, Naerbo (NO); Lev Ring, Bellaire, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/257,384

(22) Filed: Sep. 6, 2016

(65) Prior Publication Data

US 2016/0369573 A1 Dec. 22, 2016

Related U.S. Application Data

(63) Continuation of application No. 14/119,392, filed as application No. PCT/US2012/040227 on May 31, 2012, now Pat. No. 9,464,520.

(Continued)

(51) Int. Cl.
*E21B 47/12* (2012.01)
*E21B 17/00* (2006.01)
(Continued)

(52) U.S. Cl.
CPC .............. *E21B 17/003* (2013.01); *E21B 3/02* (2013.01); *E21B 17/00* (2013.01); *E21B 17/20* (2013.01);
(Continued)

(58) Field of Classification Search
CPC ........ E21B 47/122; E21B 31/20; E21B 19/16; E21B 19/00; E21B 19/07; E21B 19/14;
(Continued)

(56) References Cited

U.S. PATENT DOCUMENTS 2,705,614 A * 4/1955 McKibben ............ E21B 19/164
269/25
3,063,143 A 11/1962 Bodine
(Continued)

FOREIGN PATENT DOCUMENTS

EP 1083298 A2 3/2001
EP 2273058 A2 1/2011
(Continued)

*Primary Examiner* — D. Andrews
*Assistant Examiner* — Ronald R Runyan
(74) *Attorney, Agent, or Firm* — Patterson & Sheridan, L.L.P.

(57) ABSTRACT

Signal communications at a drilling system generally includes communicating upwards or downwards from the rig floor. For example, signal communications upwards may comprise the control of a cementing head operation (e.g., actuating cementing head). Signal communications downwards may comprise the activation of tools and their confirmation (e.g., hole opening tools, liner hangers, and packers). Actuation may be performed via umbilicals, for example, via pressure spikes or the dropping of balls, darts, or radio-frequency identification (RFID) tags. However, issues may arise wherein, for example, a ball may not properly land to close a circulation valve. As another example, a cementing head could be over 100 feet above the rig floor, which may make it difficult for signal communications via an umbilical. Accordingly, what is needed are techniques and apparatus for activation of tools and their confirmation by a remote communication system.

7 Claims, 10 Drawing Sheets

Related U.S. Application Data

(60) Provisional application No. 61/491,755, filed on May 31, 2011.

(51) Int. Cl.

| | | |
|---|---|---|
| *E21B 31/20* | (2006.01) | |
| *E21B 19/07* | (2006.01) | |
| *E21B 19/16* | (2006.01) | |
| *E21B 3/02* | (2006.01) | |
| *E21B 17/20* | (2006.01) | |
| *E21B 19/06* | (2006.01) | |
| *E21B 19/10* | (2006.01) | |
| *E21B 33/05* | (2006.01) | |
| *E21B 43/08* | (2006.01) | |
| *E21B 47/14* | (2006.01) | |
| *G01V 1/52* | (2006.01) | |

(52) U.S. Cl.
CPC .............. *E21B 19/06* (2013.01); *E21B 19/07* (2013.01); *E21B 19/10* (2013.01); *E21B 19/16* (2013.01); *E21B 31/20* (2013.01); *E21B 33/05* (2013.01); *E21B 43/08* (2013.01); *E21B 47/122* (2013.01); *E21B 47/14* (2013.01); *G01V 1/52* (2013.01)

(58) Field of Classification Search
CPC ........ E21B 19/15; E21B 19/155; E21B 19/20; E21B 21/01; E21B 47/12
See application file for complete search history.

(56) References Cited

U.S. PATENT DOCUMENTS

| | | | |
|---|---|---|---|
| 4,017,845 A | 4/1977 | Kilian et al. | |
| 4,057,781 A | 11/1977 | Scherbatskoy | |
| 4,073,341 A | 2/1978 | Parker | |
| 4,806,928 A | 2/1989 | Veneruso | |
| 4,839,644 A | 6/1989 | Safinya et al. | |
| 5,040,603 A | 8/1991 | Baldridge | |
| 5,140,318 A | 8/1992 | Stiner | |
| 5,159,226 A * | 10/1992 | Montgomery | ........ B06B 1/0611 |
| | | | 310/333 |
| 5,833,002 A | 11/1998 | Holcombe | |
| 6,055,213 A * | 4/2000 | Rubbo | .................... E21B 41/00 |
| | | | 175/40 |
| 6,411,074 B1 | 6/2002 | Kruchowy et al. | |
| 6,557,641 B2 * | 5/2003 | Sipos | ....................... E21B 19/10 |
| | | | 166/380 |
| 6,788,263 B2 | 9/2004 | Clark et al. | |
| 7,071,837 B2 | 7/2006 | Hudson et al. | |
| 7,145,473 B2 | 12/2006 | Wisler et al. | |
| 2002/0040782 A1 | 4/2002 | Rytlewski et al. | |
| 2004/0051649 A1 | 3/2004 | Hudson | |
| 2004/0060697 A1 | 4/2004 | Tilton et al. | |
| 2004/0174163 A1 | 9/2004 | Rogers et al. | |
| 2005/0000696 A1 | 1/2005 | McDaniel et al. | |
| 2006/0070743 A1 * | 4/2006 | Shah | ......................... G01V 1/52 |
| | | | 166/382 |
| 2007/0175633 A1 * | 8/2007 | Kosmala | ............ E21B 47/0007 |
| | | | 166/250.15 |
| 2008/0296012 A1 | 12/2008 | Peer et al. | |
| 2009/0090502 A1 | 4/2009 | Lumbye et al. | |
| 2009/0272544 A1 | 11/2009 | Giroux et al. | |
| 2010/0243325 A1 * | 9/2010 | Veeningen | ............ E21B 17/028 |
| | | | 175/40 |
| 2011/0018734 A1 | 1/2011 | Varveropoulos et al. | |
| 2011/0168380 A1 * | 7/2011 | Osmundsen | ............ E21B 33/05 |
| | | | 166/70 |
| 2011/0214853 A1 * | 9/2011 | Robichaux | ............ E21B 33/05 |
| | | | 166/66 |
| 2013/0327532 A1 | 12/2013 | Ring et al. | |

FOREIGN PATENT DOCUMENTS

| | | |
|---|---|---|
| WO | 0212676 A1 | 2/2002 |
| WO | 2010047600 A2 | 4/2010 |

* cited by examiner

METHOD OF INCORPORATING REMOTE COMMUNICATION WITH OILFIELD TUBULAR HANDLING APPARATUS

CROSS-REFERENCE TO RELATED APPLICATIONS

This application is a continuation of U.S. application Ser. No. 14/119,392, filed Nov. 21, 2013 and entitled "Method of Incorporating Remote Communication with Oilfield Tubular Handling Apparatus," which is a U.S. National Stage Entry of International Application No. PCT/US2012/040227, filed May 31, 2012, which claims benefit of U.S. Provisional Patent Application Ser. No. 61/491,755, filed May 31, 2011, all of which are herein incorporated by reference in their entireties.

BACKGROUND OF THE INVENTION

Field of the Invention

Embodiments of the present invention generally relate to incorporating remote communication with oilfield tubular handling apparatus.

Description of the Related Art

In wellbore construction and completion operations, a wellbore is initially formed to access hydrocarbon-bearing formations (i.e., crude oil and/or natural gas) by the use of drilling. Drilling is accomplished by utilizing a drill bit that is mounted on the end of a drill support member, commonly known as a drill string. To drill within the wellbore to a predetermined depth, the drill string is often rotated by a top drive or rotary table on a surface platform or rig, or by a downhole motor mounted towards the lower end of the drill string. After drilling to a predetermined depth, the drill string and drill bit are removed and a section of casing is lowered into the wellbore. An annulus is thus formed between the string of casing and the formation. The casing string is temporarily hung from the surface of the well. A cementing operation is then conducted in order to fill the annular area with cement. The casing string is cemented into the wellbore by circulating cement into the annulus defined between the outer wall of the casing and the borehole. The combination of cement and casing strengthens the wellbore and facilitates the isolation of certain areas of the formation behind the casing for the production of hydrocarbons.

It is common to employ more than one string of casing or liner in a wellbore. In this respect, the wellbore is drilled to a first designated depth with a drill bit on a drill string. The drill string is removed. A first string of casing is then run into the wellbore and set in the drilled out portion of the wellbore, and cement is circulated into the annulus behind the casing string. Next, the wellbore is drilled to a second designated depth, and a second string of casing or liner, is run into the drilled out portion of the wellbore. If the second string is a liner, the liner string is set at a depth such that the upper portion of the second liner string overlaps the lower portion of the first string of casing. The second liner string is then fixed, or "hung" off of the existing casing using a liner hanger to fix the new string of liner in the wellbore. The second liner string is then cemented. A tie-back casing string may then be landed in a polished bore receptacle (PBR) of the second liner string so that the bore diameter is constant through the liner to the surface. This process is typically repeated with additional liner strings until the well has been drilled to total depth. As more casing or liner strings are set in the wellbore, the casing or liner strings become progressively smaller in diameter in order to fit within the previous casing string. In this manner, wells are typically formed with two or more strings of casing and/or liner of an ever-decreasing diameter.

Signal communications at the drilling system may comprise communicating upwards or downwards from the rig floor. For example, signal communications upwards may comprise the control of a cementing head operation (e.g., actuation). Signal communications downwards may comprise the activation of tools and their confirmation (e.g., hole opening tools, liner hangers, and packers). Actuation may be performed via umbilicals, for example, via pressure spikes or the dropping of balls, darts, or radio-frequency identification (RFID) tags.

SUMMARY OF THE INVENTION

One embodiment of the present invention provides an apparatus for remotely communicating with a device in a wellbore. The apparatus generally includes an oilfield tubular handling apparatus; partial toroidal coil sections integrated with the oilfield tubular handling apparatus, wherein the partial toroidal coil sections form a toroidal coil upon handling a tubular member with the handling apparatus; and a microcontroller for communicating with the device via at least one of signals transmitted or received through the tubular member using the toroidal coil.

Another embodiment of the present invention provides a method for remotely communicating with a device in a wellbore. The method generally includes integrating partial toroidal coil sections with an oilfield tubular handling apparatus; handling a tubular member with the handling apparatus, wherein the handling causes the partial toroidal coil sections to form a toroidal coil; and communicating with the device via at least one of signals transmitted or received through the tubular member using the toroidal coil.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
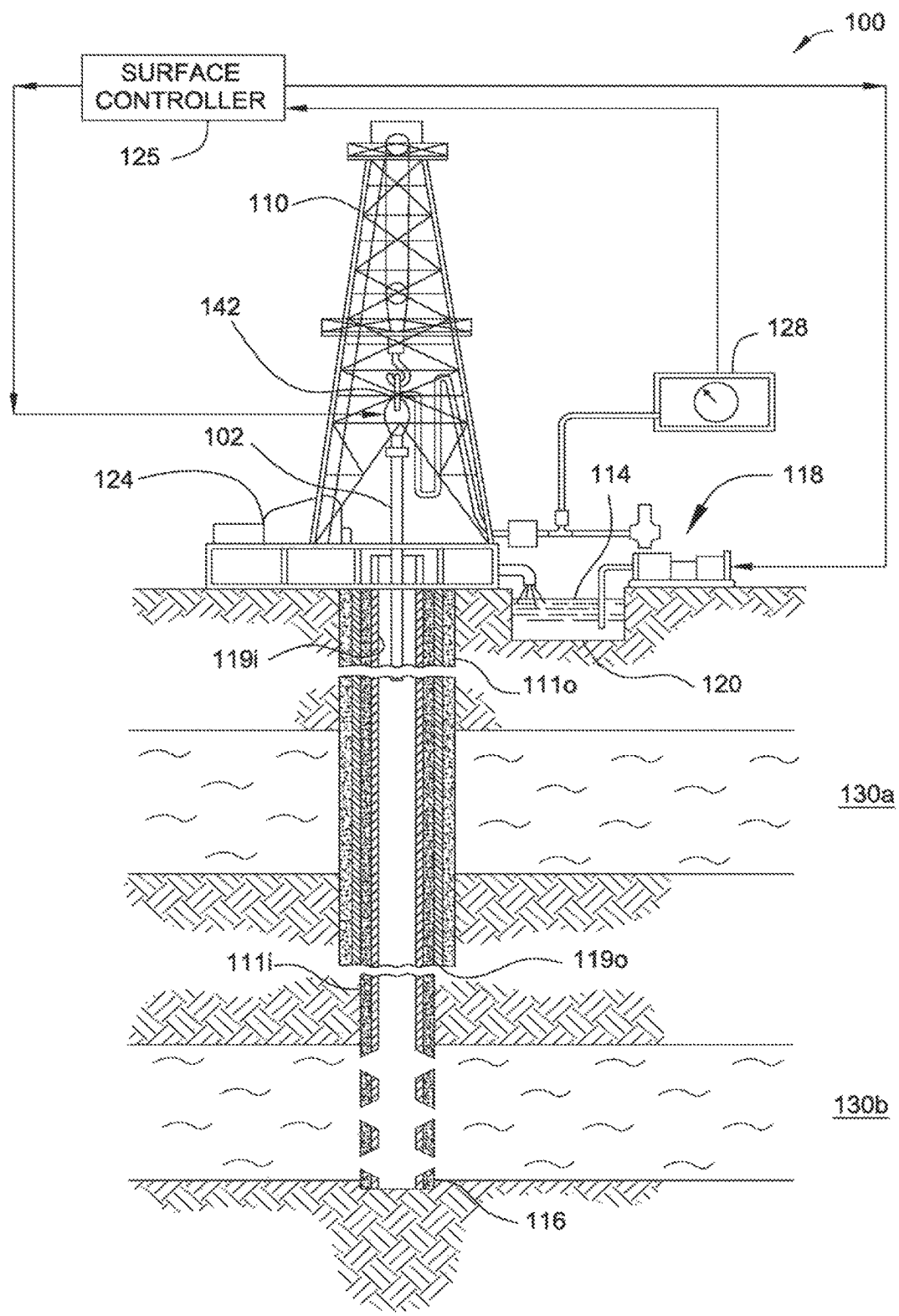
FIG. 1 illustrates a drilling system, according to an embodiment of the present invention.

FIG. 1 illustrates a drilling system 100, according to an embodiment of the present invention. The drilling system 100 may include a derrick 110. The drilling system 100 may further include drawworks 124 for supporting, for example, a top drive 142. A workstring 102 may comprise joints of threaded drill pipe connected together, coiled tubing, or casing. Make up of the workstring 102 may be performed by oilfield tubular handling apparatus, such as makeup tongs. Examples of other oilfield tubular handling apparatus generally include an elevator, slips, a spider, the top drive 142, and gripping tools attached to the top drive 142.

Figure 2:
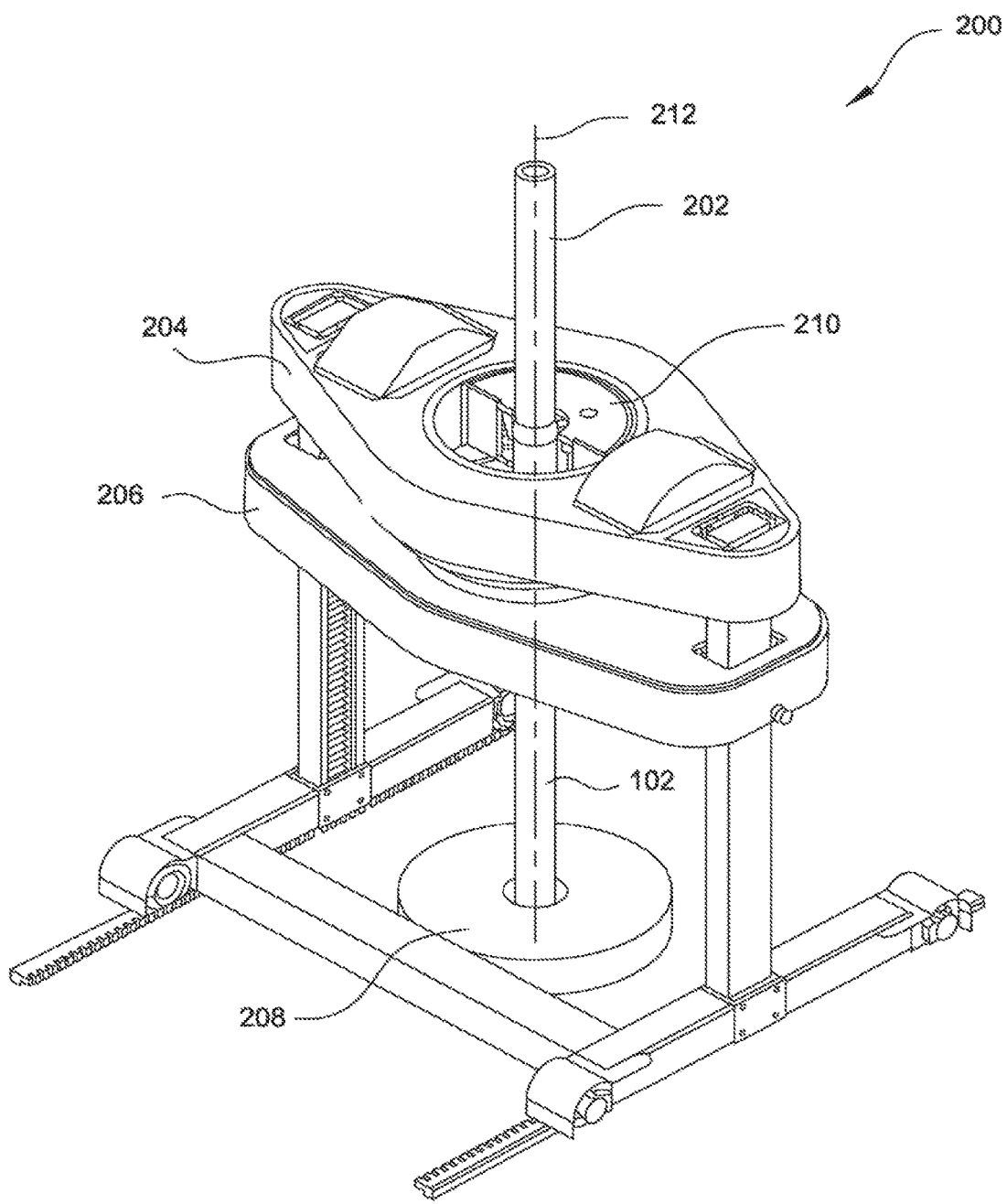
FIG. 2 illustrates an assembly of tongs that may be used for making up and breaking out a workstring, according to an embodiment of the present invention.

FIG. 2 illustrates an assembly 200 of tongs 204, 206 that may be used for making up and breaking out the workstring 102, according to an embodiment of the present invention. As described above, the workstring 102 may comprise joints of threaded drill pipe 202 connected together. The assembly 200 may be located, for example, in the drilling system 100 of FIG. 1, above slips 208 of the drilling rig. Each tong 204, 206 may comprise two crescent-shaped groups 210 of clamps, of which only one is shown in the drawings, for illustrative purposes. Each group 210 of clamps may comprise a plurality of clamps distributed around the drilling center 212, wherein the plurality of clamps may grip their respective piping sections when making up and breaking out the workstring 102. Although FIG. 2 illustrates two crescent-shaped groups 210 of clamps, the clamps may be distributed around the drilling center 212 in various other manners (e.g., one group of clamps).

Referring back to FIG. 1, the top drive 142 may be omitted (e.g., if the workstring 102 is coiled tubing). A rig pump 118 may pump drilling fluid, such as mud 114, out of a pit 120, passing the mud through a stand pipe and Kelly hose to the top drive 142. The mud 114 may continue into the workstring 102. The drilling fluid and cuttings, collectively returns, may flow upward along an annulus formed between the workstring and one of the casings 119i,o, through a solids treatment system (not shown) where the cuttings may be separated. The treated drilling fluid may then be discharged to the mud pit 120 for recirculation. A surface controller 125 may be in data communication with the rig pump 118, pressure sensor 128, and top drive 142.

After a first section of a wellbore 116 has been drilled, an outer casing string 119o may be installed in the wellbore 116 and cemented 111o in place. The outer casing string 119o may isolate a fluid bearing formation 130a, such as aquifer, from further drilling and later production. Alternatively, fluid bearing formation 130a may instead be hydrocarbon bearing and may have been previously produced to depletion or ignored due to lack of adequate capacity. After a second section of the wellbore 116 has been drilled, an inner casing string 119i may be installed in the wellbore 116 and cemented 111i in place. The inner casing string 119i may be perforated and hydrocarbon bearing formation 130b may be produced, such as by installation of production tubing (not shown) and a production packer.

Signal communications at the drilling system 100 generally includes communicating upwards or downwards from the rig floor. For example, signal communications upwards may comprise the control of a cementing head operation (e.g., actuating cementing head). Signal communications downwards may comprise the activation of tools and their confirmation (e.g., hole opening tools, liner hangers, and packers). Actuation may be performed via umbilicals, for example, via pressure spikes or the dropping of balls, darts, or radio-frequency identification (RFID) tags. However, issues may arise wherein, for example, a ball may not properly land to close a circulation valve. Therefore, there may not be a sufficient pressure increase for the activation of a tool. As another example, a cementing head could be over 100 feet above the rig floor, which may make it difficult for signal communications via an umbilical. Accordingly, what is needed are techniques and apparatus for activation of tools and their confirmation by a remote communication system.

For some embodiments of the present invention, a remote communication system may be incorporated into oilfield tubular handling apparatus, such as the tongs 204, 206 illustrated in FIG. 2. For example, the remote communication system may comprise toroidal coils that may be incorporated with the tongs 204, 206, as will be discussed further herein. For some embodiments, a remote communication system may be incorporated with other oilfield tubular handling apparatus, such as, but not limited to, an elevator, slips, a spider, a top drive, and gripping tools attached to a top drive.

The remote communication system generally includes a device incorporated with the oilfield tubular handling apparatus and another device for exchanging signals via a medium (e.g., workstring 102). For example, signals may be transmitted from the device incorporated with the oilfield tubular handling apparatus through the workstring 102 upwards (e.g., to a cementing head) or downwards (e.g., to activate a liner hanger) for remote communications with the other device. The device incorporated with the oilfield tubular handling apparatus may be controlled by a handheld device, for example, from within a dog house (i.e., a safe distance from the wellbore; outside zone zero). The signals may be acoustic or electromagnetic (EM) signals.

When the signals transmitted or received are acoustic signals (e.g., transmitted by a piezoelectric stack or a solenoid), piezoelectric sensors (e.g., accelerometer) may be used to detect acoustic vibrations generated along an acoustic throughpipe (e.g., workstring 102). For acoustic signals, the piezoelectric stack may be in physical contact with the medium (e.g., rigid contact with the workstring 102). However, for EM signals, toroidal coils may or may not be in physical contact with the medium. For some embodiments, the signal may be transmitted longitudinally with respect to the medium. For other embodiments, the signal may be transmitted transversely with respect to the medium.

When the signals exchanged between the devices are EM signals, the devices may include toroidal coils, as will be discussed further herein. Various parameters of the toroidal coils may be adjusted, such as the coil size, magnetic core permeability, wire size, and the number of windings. The coils winding direction, operating frequency, signal type, and data rate may be evaluated prior to incorporating the toroidal coils with the devices. More specifically, each device may include two toroidal coils: one for transmitting and another for receiving. A transmission between the devices may be achieved by energizing the winding of a transmission coil (e.g., the transmitting toroidal coil of the device incorporated with the oilfield tubular handling apparatus). As described above, the transmission may be initiated by the handheld device. The current that flows through the winding may produce a magnetic flux in the core, which than induces a current in a conductor positioned in the center of the toroid (e.g., workstring 102), which can represent various signals. The current generated has to be high enough to overcome potential noise, yet low enough to conserve power. If a string of voltage pulses is applied to the coil, a corresponding string of current pulses may be induced in the workstring 102.

The transmission may be received at the other device (e.g., by the receiving toroidal coil of the other device) by converting the current pulses flowing through the workstring 102 into voltage pulses. Confirmation of the operation may be indicated by a signal transmitted from the other device to the device incorporated with the oilfield tubular handling apparatus. For some embodiments, the handheld device may receive an indication of the confirmation. For some embodiments, multiple confirmations may be received. The toroidal coils may have different configurations. However, the characteristics of the toroidal coils may have to be similar (e.g., windings) where, for example, the receiver of the one toroidal coil may recognize signals transmitted by the transmitter of the other toroidal coil.

For some embodiments, the toroidal coils may be mounted on a frame comprising one or more hinges (e.g., open frame toroidal coils), where the ferromagnetic core of a toroidal coil may be physically interrupted but the magnetic flux generated may be continuous due to the inductive coupling at the ends of the individual core sections (i.e., the individual core sections substantially complete a toroidal coil due to inductive coupling at the ends of the core sections). Although there may be varied amounts of spacing between the different core sections, as long as there is inductive coupling at the ends of the individual core sections, the individual core sections may substantially complete a toroidal coil.

Therefore, the toroidal coil sections may be mounted on a movable platform (such as the slips 208 or the tongs 204, 206) and they may move (e.g., closer and further to the workstring 102) in the same time with the platform. By keeping the toroidal coils on the platform, the toroidal coils may be insulated (e.g., from the outside environment) and in contact with the ground (i.e., grounded connection). For some embodiments, the grounded connection may instead be provided by the tubular (e.g., workstring 102), wherein the tubular may have an upper section ground (e.g., through a top drive, which may be grounded) or a lower section ground (e.g., by being in physical contact with the ground via slips and casing). In the lower section of the tongs 204, 206 a transmitter and receiver coil may be incorporated, powered by either alternating current (AC) or direct current (DC) depending on availability. For example, coils closer to the rig floor may be powered by AC, and coils further from the rig floor may be powered by DC. The toroidal coil may properly function with or with no contact to the pipe through which it communicates (e.g., workstring 102).

Figure 3A:
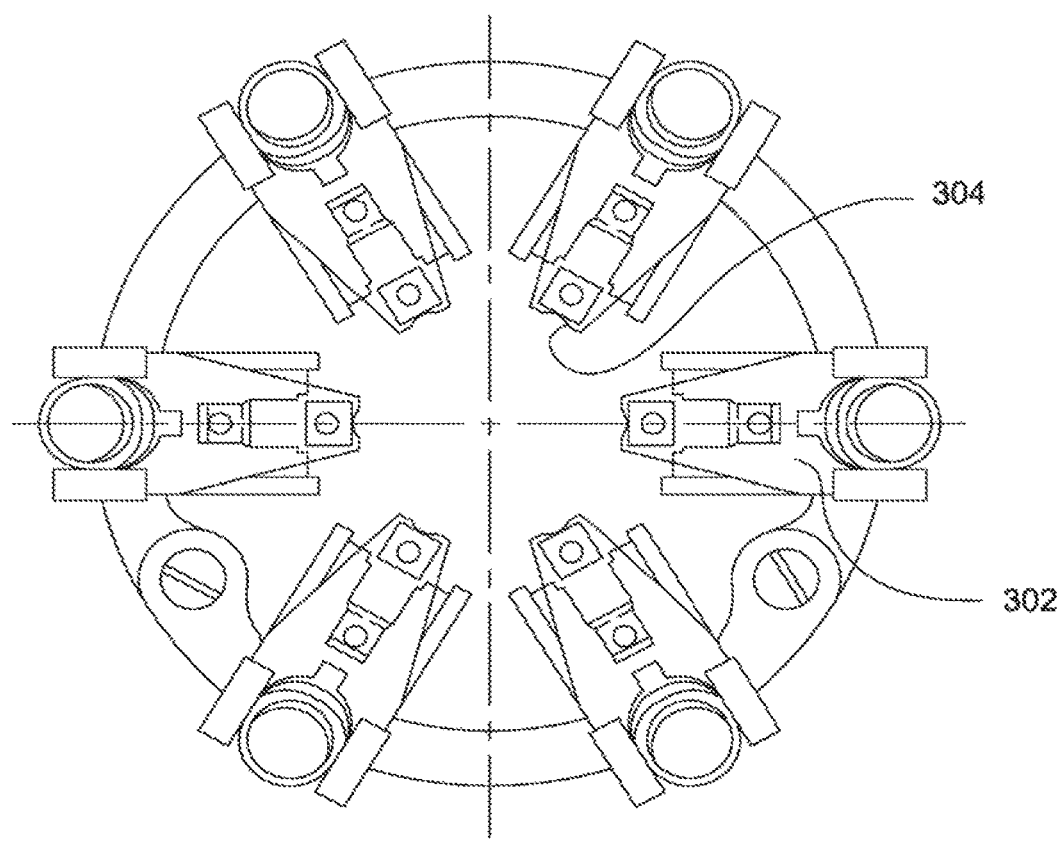
FIGS. 3A-C illustrate embodiments of a plurality of clamps distributed in an oilfield tubular handling apparatus for handling a tubular, according to an embodiment of the present invention.
Figure 3B:
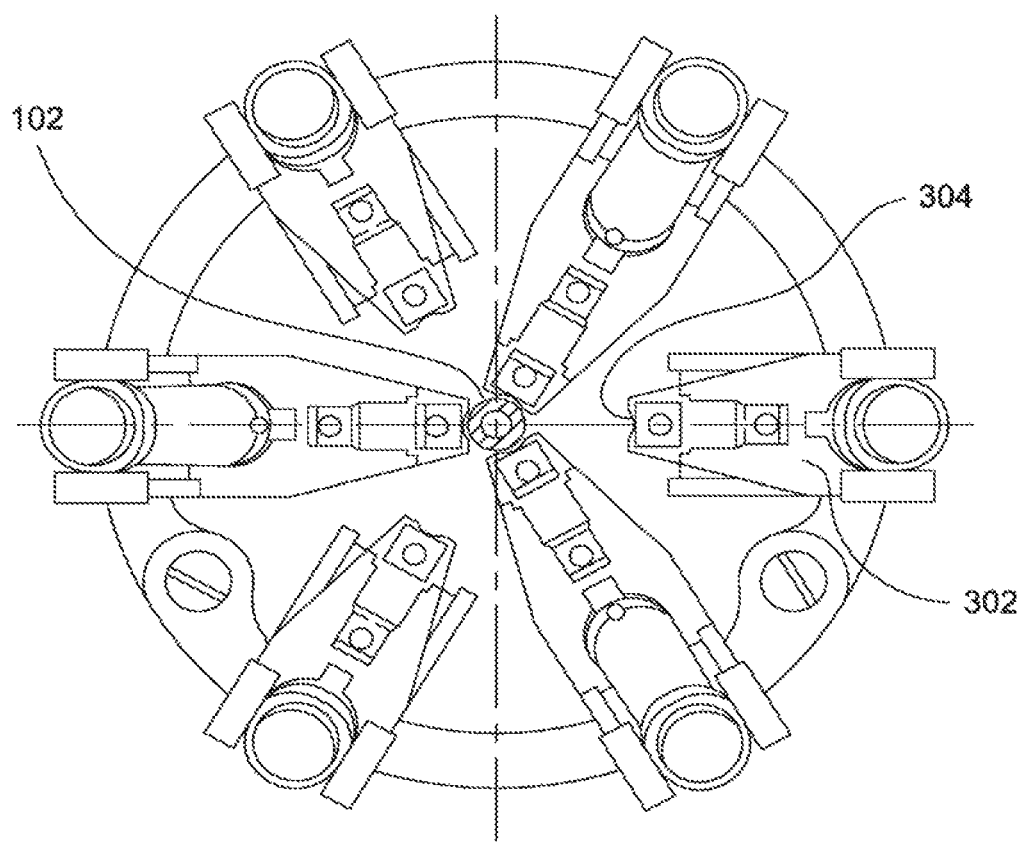
Figure 3C:
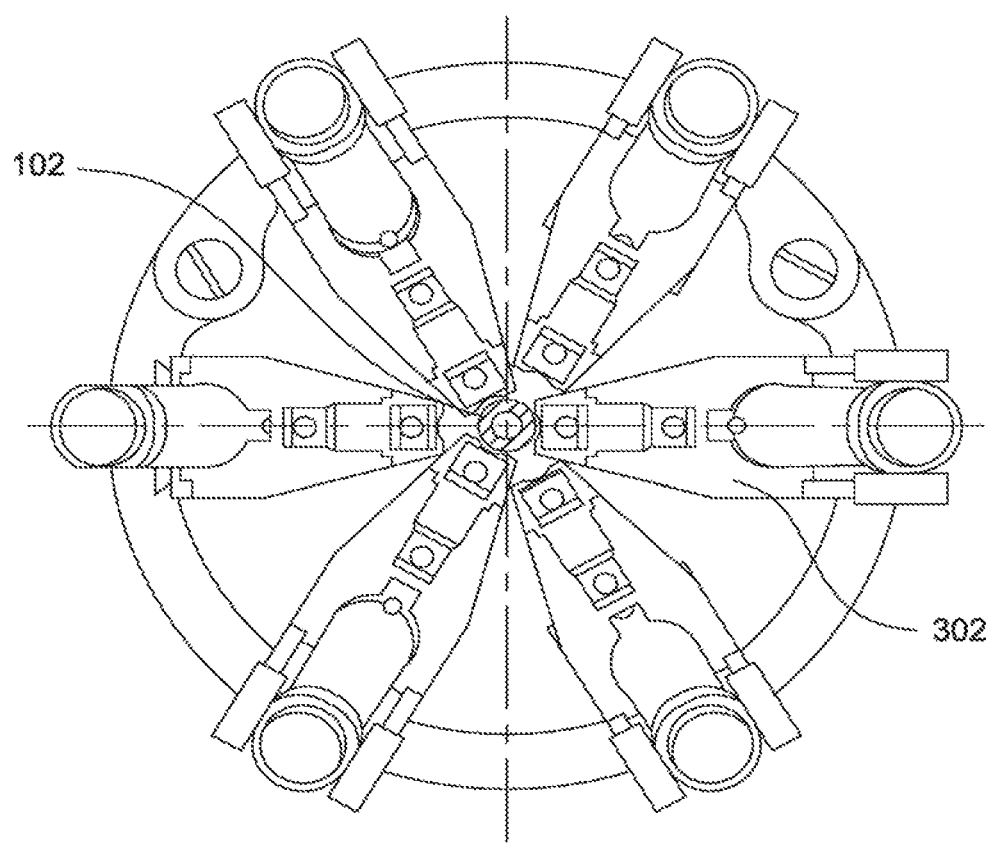

FIGS. 3A-C illustrate embodiments of a plurality of clamps 302 distributed in an oilfield tubular handling apparatus (e.g., tongs 204, 206) for handling a tubular (e.g., making up and breaking out the workstring 102). Depending on the dimensions of the workstring 102, different number of clamps 302 may be displaced towards the workstring 102, whereby the clamps 302 grip around the workstring 102. For some embodiments, the workstring 102 may have different diameters along a length of the workstring 102. FIG. 3A illustrates the clamps 302 in a retracted, open position. FIG. 3B illustrates three of the clamps 302 in an extended, closed position, gripping the workstring 102. However, FIG. 3C illustrates all of the clamps 302 in an extended, closed position around the workstring 102, wherein the diameter of the workstring 102 may be larger.

For some embodiments, the toroidal coil may comprise a non-continuous ferromagnetic core, wherein the coil may be divided into partial toroidal coil sections 304. The partial toroidal coil sections 304 may be integrated with the oilfield tubular handling apparatus. For example, each partial toroidal coil section 304 may be integrated with a respective clamp 302. As the clamps 302 move closer to the workstring 102, the partial toroidal coil sections 304 may form a toroidal coil (i.e., function as a toroidal coil due to inductive coupling at the ends of the toroidal coil sections 304) for communicating with a device via at least one of signals transmitted or received through the workstring 102. Since the number of clamps 302 that grip the workstring 102 may vary, as illustrated in FIGS. 3B-C, the toroidal coil may comprise a different number of partial toroidal coil sections 304, based on the diameter of the workstring 102. For example, for the workstring 102 illustrated in FIG. 3B, only three partial toroidal coil sections 304 may be required to form the toroidal coil. However, with the larger diameter workstring 102 in FIG. 3C all the partial toroidal coil sections 304 may be required (e.g., six as illustrated with the six clamps 302). For some embodiments, a signal may be transmitted when a toroidal coil has been formed (e.g., a sufficient number of partial toroidal coil sections 304 have moved close enough together and to the workstring 102 to function as a toroidal coil).

Figure 4:
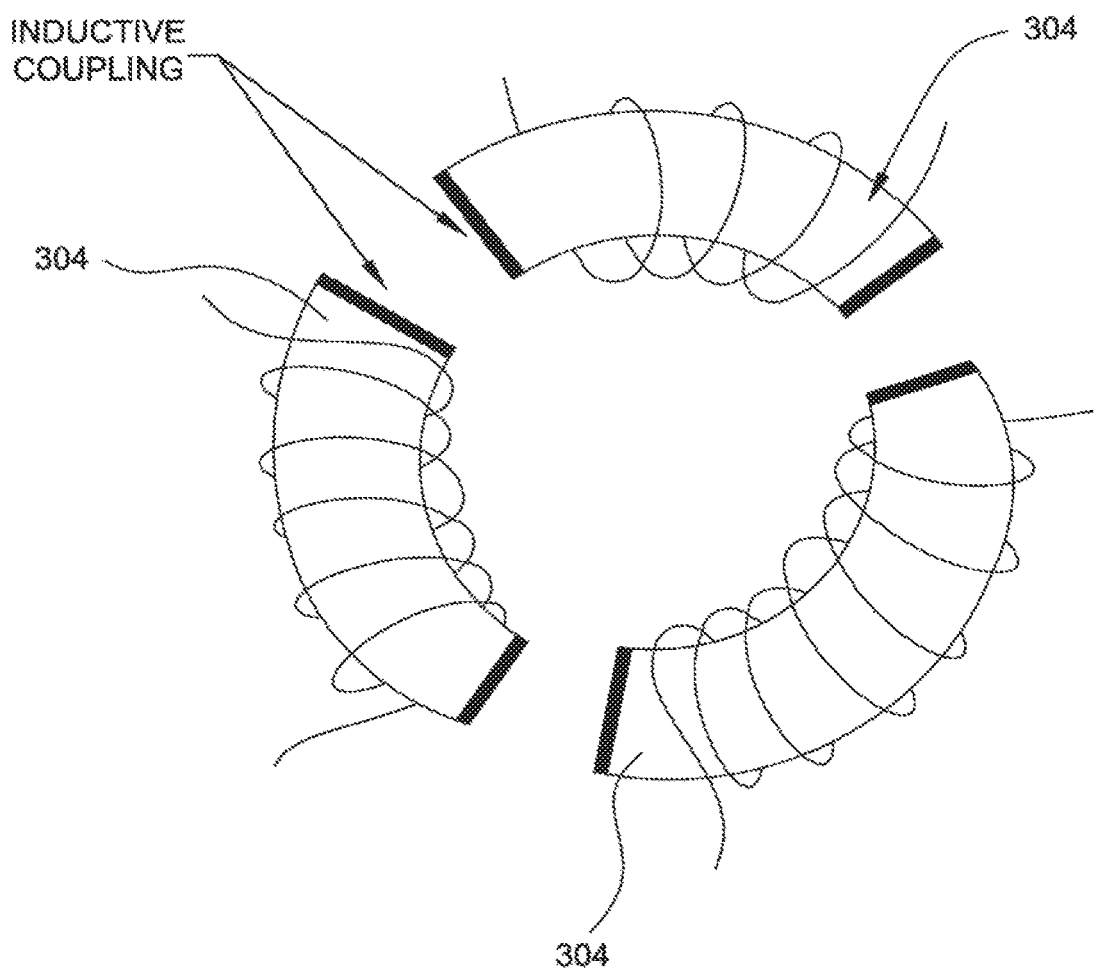
FIG. 4 illustrates partial toroidal coil sections that may form a toroidal coil, according to an embodiment of the present invention.

FIG. 4 illustrates the partial toroidal coil sections 304 that may form a toroidal coil, according to the configuration in FIG. 3B. Although the ferromagnetic core of the toroidal coil may be physically interrupted, the magnetic flux generated may be continuous due to the inductive coupling at the ends of the partial toroidal coil sections 304.

For some embodiments, the toroidal coil that is formed from the partial toroidal coil sections 304 may function as a transmitter and/or receiver. For example, in a cementing head operation, a toroidal coil located on the rig floor may be used as a transmitter to transmit a signal through a medium (e.g., workstring 102) in connection with the cementing head (e.g., communicating with another toroidal coil located at the cementing head). The toroidal coil may also be used as a receiver to receive signals upon actuation of the operations at the cementing head (e.g., dropping plugs/darts and/or validation/confirmation tools) or to receive signals indicating the status of the cementing head.

Figure 5A:
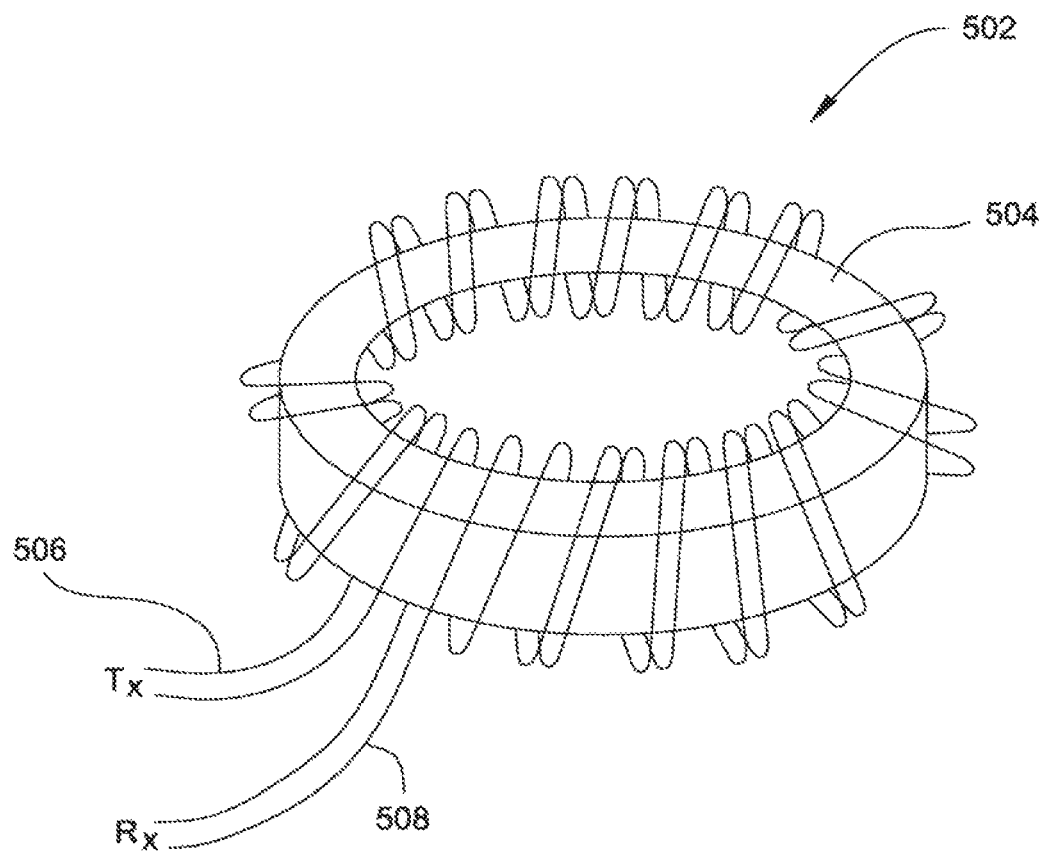
FIGS. 5A-B illustrate a toroidal coil with the ability to function as a transmitter and a receiver, according to certain aspects of the present invention.
Figure 5B:
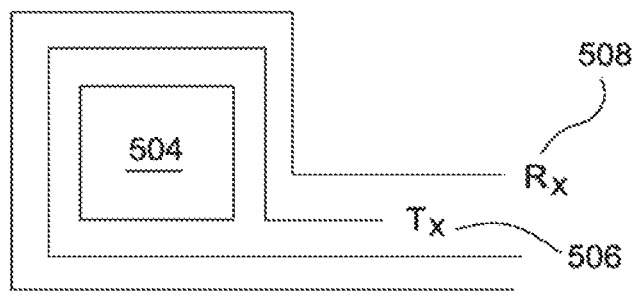

FIGS. 5A-B illustrate a toroidal coil 502 with the ability to function as a transmitter and a receiver, according to an embodiment of the present invention. The toroidal coil 502 may comprise a single core 504, wherein the core 504 may comprise a first winding 506 for transmitting signals, and a second winding 508 for receiving signals, wherein the windings 506, 508 may have different configurations. Examples of configurations that may differ between the windings 506, 508 comprise a different number of windings and a different diameter of wiring for the winding. In addition, the coils winding direction, operating frequency, signal type, and data rate may differ between the windings 506, 508. The receiver may require increased sensitivity to compensate for noise that may be received (signal-to-noise ratio (SNR)). FIG. 5B illustrates a cross section of the toroidal coil 502 that indicates the first winding 506 for transmitting signals and the second winding 508 for receiving signals. Although not illustrated, the toroidal coil 502 may be split into partial toroidal coil sections integrated with oilfield tubular handling apparatus, as described above. For some embodiments, the partial toroidal coil sections may form first and second toroidal coils, wherein the first toroidal coil may be used for transmitting the signals and the second toroidal coil may be used for receiving the signals.

Figure 6A:
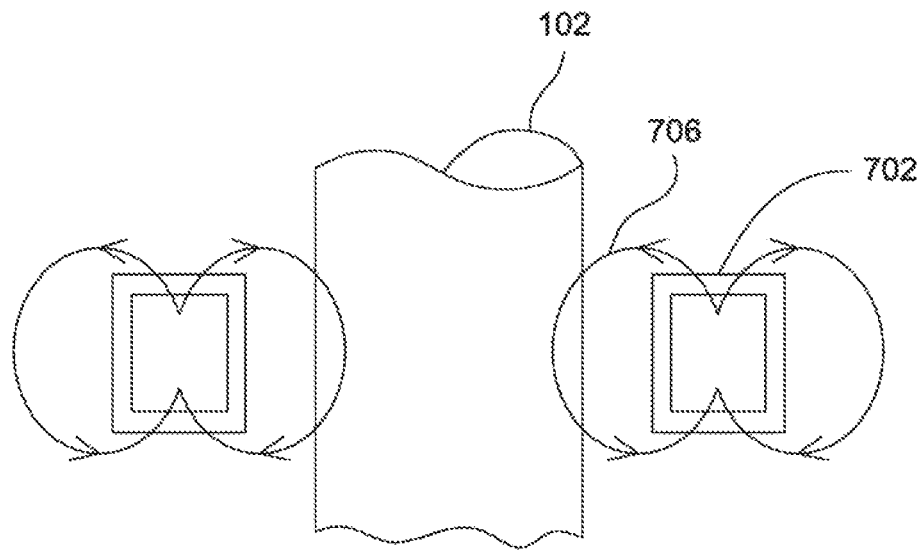
FIGS. 6A-B illustrate placement of a toroidal coil in relation to a workstring, according to certain aspects of the present invention.
Figure 6B:
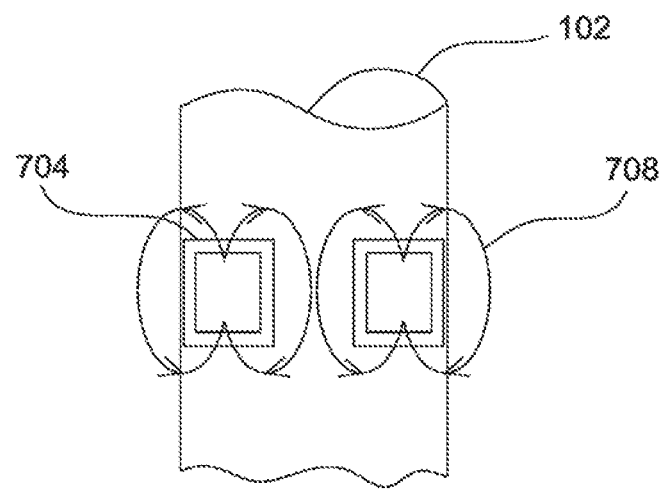

FIGS. 6A-B illustrate placement of a toroidal coil in relation to the workstring 102, according to embodiments of the present invention. Due to the magnetic fields that are generated by the toroidal coil, the toroidal coil may be placed inside or outside the workstring 102. FIG. 6A illustrates a toroidal coil 702 placed outside the workstring 102, wherein the magnetic fields 706 generated inside the toroidal coil 702 may be used to transmit and receive signals. An example of when the toroidal coil 702 may be placed outside the workstring 102 includes an external gripping tool adapted to incorporate a toroidal coil. FIG. 6B illustrates a toroidal coil 704 placed inside the workstring 102, wherein the magnetic fields 708 generated outside the toroidal coil 704 may be used to transmit and receive signals. Examples of when the toroidal coil 704 may be placed inside the workstring 102 include an internal gripping tool or a mud fillup tool adapted to incorporate a toroidal coil. The toroidal coil 704 may be placed inside the workstring 102 in such a manner, wherein tool functionality may not be compromised. In other words, there may be no obstruction within the workstring 102 such that tools may travel past the toroidal coil 704 within the workstring 102.

As an example, for an internal gripping tool attached to a top drive, the internal gripping tool may be adapted to incorporate the toroidal coil 704. For some embodiments, the toroidal coil 704 may be used for remote communications with the internal gripping tool itself. For other embodiments, the toroidal coil 704 may be used for remote communications with a tool located elsewhere, e.g., with a cementing head. Rather than signaling communications upward to a cementing head, for example, from a toroidal coil that would have to be placed at the rig floor, the toroidal coil 704 may be used for communicating with the cementing head.

Figure 7E:
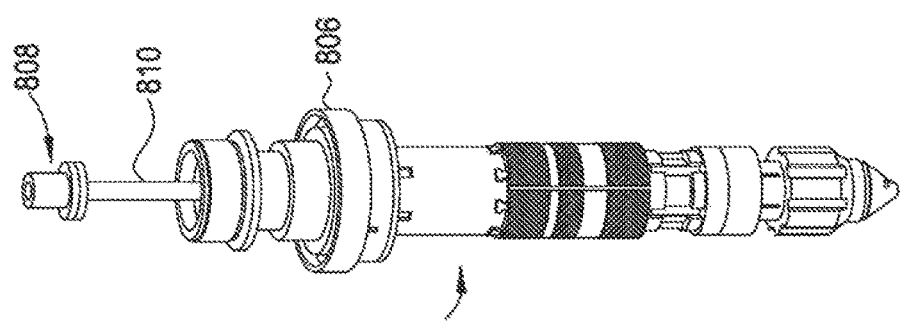
FIGS. 7A-E illustrate example external and internal gripping tools that may be adapted to incorporate a toroidal coil for remote communications, according to certain aspects of the present invention.
Figure 7D:
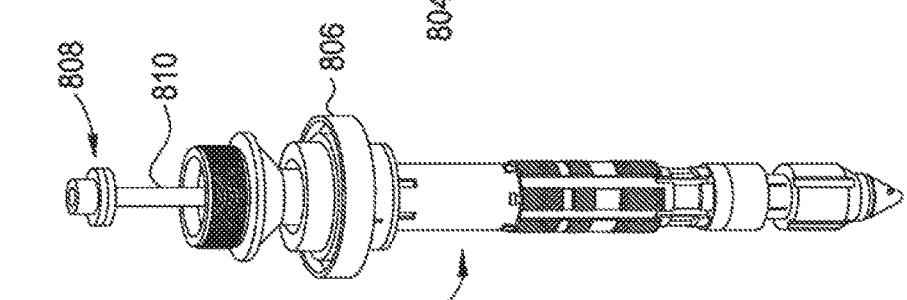
Figure 7C:
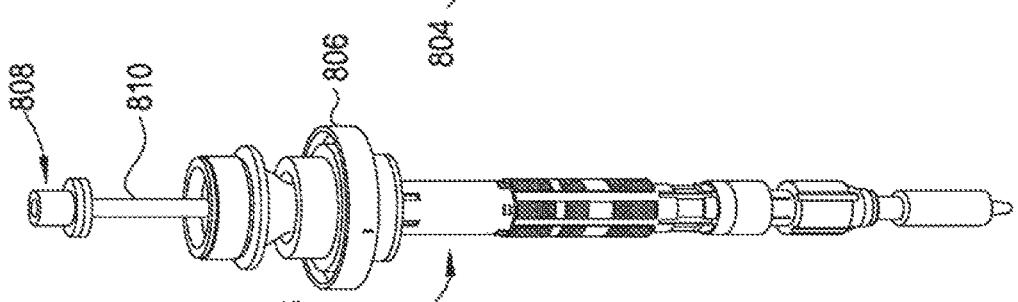
Figure 7B:
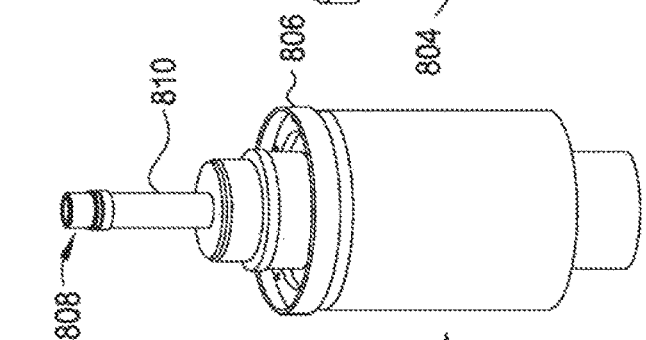
Figure 7A:
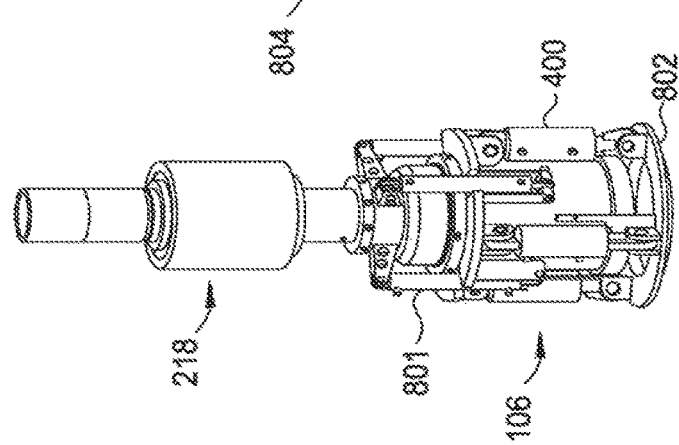

FIGS. 7A-E illustrate example external and internal gripping tools that may be adapted to incorporate a toroidal coil for remote communications, according to certain aspects of the present invention. An actuator 106 may be adapted for interchangeable and/or modular use, as shown in FIGS. 7A-E. That is, one actuator 106 may be adapted to operate any size or variety of a modular gripping apparatus 804. FIG. 7A shows the actuator 106 having piston and cylinder assemblies 400, one or more compensator pistons 801, and an adapter 218 for coupling the actuator 106 to a drive mechanism. The adapter 218 may include a torque sub in order to monitor the torque applied to a joint of threaded drill pipe 202. FIGS. 7B-E show various exemplary modular gripping apparatus 804 that may be used with the actuator 106.

Actuation of the selected gripping apparatus 804 may be effected using a modular slip ring 802. The modular slip ring 802 may couple to the piston and cylinder assemblies 400 and may be movable therewith. The modular slip ring 802 may be adapted to couple to a mating slip ring 806 of the modular gripping apparatus 804. When coupled to the mating slip ring 806, the modular slip ring 802 may actuate the gripping apparatus 804. In this respect, the slip rings 802 and 806 may move in unison in response to actuation of the piston and cylinder assemblies 400, which, in turn, may cause engagement or disengagement of the gripping apparatus 804 from the joint of threaded drill pipe 202.

Torque from the drive mechanism may be transferred to the modular gripping apparatus 804 using a universal couple 808. As shown, the universal couple 808 may be positioned at the end of a rotational shaft 810 for each modular gripping apparatus 804. The universal couple 808 may be adapted to couple to a shaft within the actuator 106. With the universal couple 808 coupled to the shaft of the actuator 106, rotation may be transferred from the drive mechanism to the rotational shaft 810 and in turn to the joint of threaded drill pipe 202 via the modular gripping apparatus 804.

In operation, the modular aspect of the tubular handling system may allow for quick and easy accommodation of any size tubular without the need for removing the actuator 106 and/or the drive mechanism. Thus, the external modular gripping apparatus 804, shown in FIG. 7B, may be used initially to grip, couple, and drill with the tubular. The external modular gripping apparatus 804 may then be removed by uncoupling the slip ring 806 from slip ring 802. The internal gripping apparatus 804, shown in FIG. 7E, may then be used to continue to couple, run, and drill with tubulars. It is contemplated that gripping apparatus of any suitable size may be used during operations.

Figure 8:
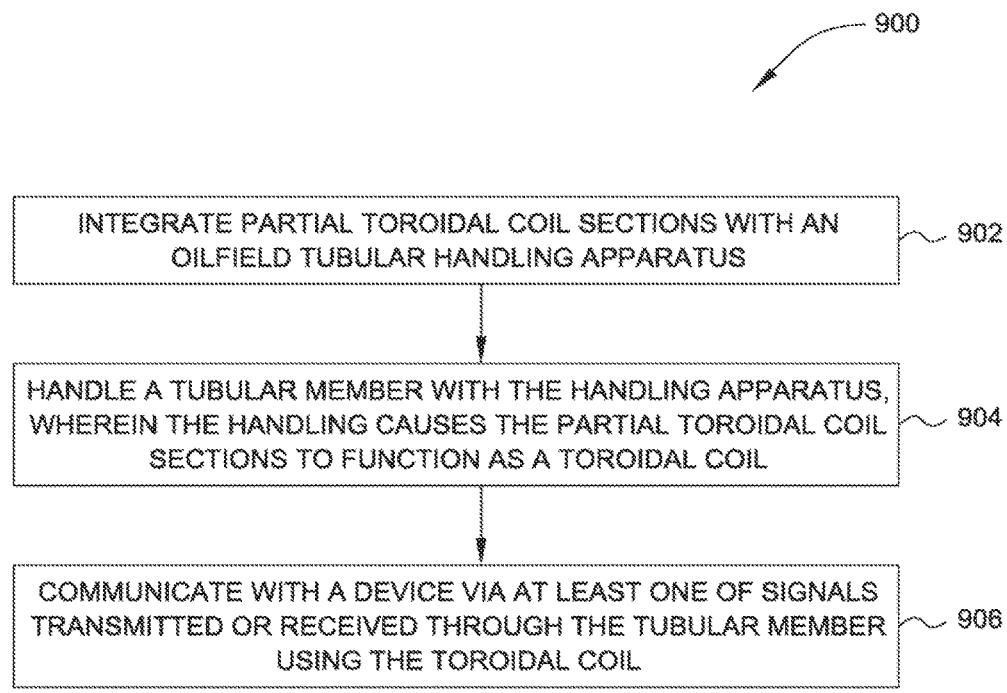
FIG. 8 is a flow diagram of exemplary operations for remotely communicating with a device in a wellbore, according to an embodiment of the present invention.

FIG. 8 illustrates operations 900 for remotely communicating with a device in a wellbore, according to certain embodiments of the present invention. The operations may begin at 902 by integrating partial toroidal coil sections with an oilfield tubular handling apparatus. For some embodiments, the partial toroidal coil sections may be permanently integrated with the handling apparatus. At 904, the handling apparatus may handle a tubular member, wherein the handling may cause the partial toroidal coil sections to function as a toroidal coil. For some embodiments, the handling may comprise moving the handling apparatus along the tubular member until an outer diameter of the tubular member causes the partial toroidal coil sections to function as the toroidal coil. For some embodiments, the partial toroidal coil sections may be independently actuated from the handling apparatus to bring the partial toroidal coil sections closer to the tubular member, causing the partial toroidal coil sections to function as the toroidal coil. At 906, communications may be exchanged with the device (e.g., by a microcontroller) via at least one of signals transmitted or received through the tubular member using the toroidal coil. For some embodiments, the microcontroller may process data and encode the data into the signals that are transmitted through the tubular member using the toroidal coil.

While the foregoing is directed to embodiments of the present invention, other and further embodiments of the invention may be devised without departing from the basic scope thereof, and the scope thereof is determined by the claims that follow.

The invention claimed is:

1. An oilfield tubular handling apparatus capable of remotely communicating with a device associated with a wellbore, comprising:
    partial toroidal coil sections integrated with the oilfield tubular handling apparatus, wherein the partial toroidal coil sections are configured to:
        form a toroidal coil upon handling a tubular member with the handling apparatus; and
        at least one of transmit signals to or receive other signals from the device, via the tubular member.

2. The handling apparatus of claim 1, wherein the toroidal coil comprises first and second windings, wherein the first winding is configured to transmit the signals, and wherein the second winding is configured to receive the other signals.

3. The handling apparatus of claim 2, wherein the first winding has a different number of windings from the second winding.

4. The handling apparatus of claim 2, wherein the first winding has a different wire diameter from the second winding.

5. The handling apparatus of claim 1, wherein the toroidal coil is not in physical contact with the tubular member.

6. The handling apparatus of claim 1, wherein a number of the partial toroidal coil sections that form the toroidal coil is dependent upon a diameter of the tubular member.

7. The handling apparatus of claim 1, wherein:
- each of the partial toroidal coil sections is integrated with a respective clamp of the oilfield tubular handling apparatus; and
- the partial toroidal coil sections are configured to form the toroidal coil as clamps of the oilfield tubular handling apparatus move closer to the tubular member.

* * * * *